United States Patent
Jaeger et al.

(10) Patent No.: US 11,441,253 B2
(45) Date of Patent: Sep. 13, 2022

(54) METHOD FOR CONTROLLING THE POSITION OF A SEAM PROFILE RELATIVE TO STRUCTURES OF A SEWING MATERIAL

(71) Applicant: PFAFF Industriesysteme und Maschinen GmbH, Kaiserslautern (DE)

(72) Inventors: Guido Jaeger, Bensheim (DE); Berthold Becker, Rimbach (DE)

(73) Assignee: PFAFF Industriesysteme und Maschinen GmbH, Kaiserslautern (DE)

( * ) Notice: Subject to any disclaimer, the term of this patent is extended or adjusted under 35 U.S.C. 154(b) by 135 days.

(21) Appl. No.: 16/970,425

(22) PCT Filed: Apr. 8, 2019

(86) PCT No.: PCT/EP2019/058739
§ 371 (c)(1),
(2) Date: Aug. 17, 2020

(87) PCT Pub. No.: WO2019/219296
PCT Pub. Date: Nov. 21, 2019

(65) Prior Publication Data
US 2020/0407898 A1     Dec. 31, 2020

(30) Foreign Application Priority Data

May 18, 2018   (DE) ..................... 10 2018 207 931.5

(51) Int. Cl.
*D05B 19/16*   (2006.01)
*D05B 19/08*   (2006.01)
*D05B 21/00*   (2006.01)

(52) U.S. Cl.
CPC ............. *D05B 19/16* (2013.01); *D05B 19/08* (2013.01); *D05B 21/00* (2013.01); *G05B 2219/45195* (2013.01)

(58) Field of Classification Search
CPC ........ D05B 19/08; D05B 19/16; D05B 21/00; D05B 21/02; D05B 21/05; D05B 21/07; G05B 2219/45195
See application file for complete search history.

(56) References Cited

U.S. PATENT DOCUMENTS

| | | |
|---|---|---|
| 4,748,920 A | 6/1988 | Stutznacker |
| 5,131,339 A | 7/1992 | Goodridge |
| 5,178,080 A | 1/1993 | Nomura et al. |
| 5,205,232 A | 4/1993 | Sadeh et al. |
| 5,222,451 A | 6/1993 | Akahane et al. |
| 6,263,815 B1 | 7/2001 | Furudate |

(Continued)

FOREIGN PATENT DOCUMENTS

| | | |
|---|---|---|
| DE | 3535644 C2 | 11/1987 |
| DE | 4203558 A1 | 8/1992 |

(Continued)

*Primary Examiner* — Danny Worrell
(74) *Attorney, Agent, or Firm* — Smartpat PLC

(57) ABSTRACT

The present disclosure relates to a method for controlling the position of a seam contour and a device for carrying out the method, wherein the position control of a seam contour relative to structures of a sewing material is based on comparison data of a structure of a reference sewing material and a structure of a working sewing material.

4 Claims, 3 Drawing Sheets

(56) References Cited

U.S. PATENT DOCUMENTS

| | | | | |
|---|---|---|---|---|
| 8,763,541 | B2* | 7/2014 | Tokura | D05B 19/12 |
| | | | | 112/102.5 |
| 9,840,795 | B2* | 12/2017 | Schweizer | D05B 19/08 |
| 9,938,650 | B2* | 4/2018 | Kongo | D05B 19/02 |
| 9,957,651 | B2* | 5/2018 | Kongo | D05C 5/06 |
| 10,017,888 | B2* | 7/2018 | Kongo | D05B 19/08 |
| 10,017,889 | B2* | 7/2018 | Kongo | D05B 19/08 |
| 10,889,925 | B2* | 1/2021 | Blenis, Jr. | D05B 19/14 |
| 2003/0031384 | A1 | 2/2003 | Zink | |
| 2009/0188414 | A1 | 7/2009 | Tokura | |
| 2012/0022602 | A1 | 1/2012 | Stewart | |
| 2015/0128835 | A1 | 5/2015 | Naka et al. | |
| 2016/0215423 | A1 | 7/2016 | Kongo et al. | |

FOREIGN PATENT DOCUMENTS

| | | |
|---|---|---|
| DE | 4205070 A1 | 8/1992 |
| DE | 68907167 | 1/1994 |
| DE | 10236581 | 3/2006 |
| DE | 102015116112 A1 | 3/2016 |
| DE | 102018207931 A1 | 11/2019 |
| EP | 0971061 A1 | 1/2000 |
| EP | 1997945 A1 | 12/2008 |
| GB | 2240193 A | 7/1991 |
| WO | 2008056903 A1 | 5/2008 |

\* cited by examiner

METHOD FOR CONTROLLING THE POSITION OF A SEAM PROFILE RELATIVE TO STRUCTURES OF A SEWING MATERIAL

CROSS-REFERENCE TO RELATED APPLICATIONS

The present patent application is a national phase entry of international patent application PCT/EP2019/058739, filed 8 Apr. 2019, and claims the priority of German patent application DE 10 2018 207 931.5, filed 18 May 2018, the contents of which are incorporated by reference herein.

TECHNICAL FIELD

The disclosure relates to a method for controlling the position of a seam contour relative to structures of a sewing material and a sewing device for carrying out such a method.

BACKGROUND

Publications EP 1 997 945 A1, EP 0 971 061 A1, US 2012/022602 A1 and GB 2 240 193 A1 disclose sewing devices with a camera for recording a sewing material, wherein a seam contour to be sewn is determined on the basis of the recorded image data.

It has been shown that, in particular in the case of a position-critical sewing material with a structure, for example leather with a perforated pattern, the application of the structure, for example the perforated pattern, cannot easily be arranged on the sewing material in a reproducible manner due to inhomogeneous properties of the sewing material. With the devices and methods known from the state of the art, a reproducible sewing of a seam relative to a structure is not possible, at least with high accuracy requirements regarding the position of the seam relative to the structure.

DE 35 35 644 C2 discloses a method for quilting along the contours of patterns applied to flat elastic fabrics and a device for carrying out the method. DE 689 07 167 T2 discloses a method and a device for feeding sheet material. DE 102 36 581 A1 discloses a method for compensating pattern distortions on flat working material, which is spread on a delivery surface. U.S. Pat. No. 5,205,232 discloses a device for edge detection and sewing. US 2009/0188414 A1 discloses a sewing machine and a control program for a sewing machine. DE 42 03 558 A1 discloses a sewing material position correction device. DE 42 05 070 A1 discloses a method for positioning and feeding a sewing material. DE 10 2015 116 112 A1 discloses a shape recognition device and a sewing machine.

SUMMARY

One object of the present disclosure is to provide a method that enables a sufficiently precise position control of a seam contour relative to the structures of a sewing material, even with high accuracy requirements. This object is solved with the features as claimed.

The invention is based on the realization that a sewing program can be adapted in such a manner that the position control of a seam contour relative to the structure of a sewing material is carried out on the basis of data obtained from comparison of a structure of a reference sewing material and a working sewing material.

With a method for controlling the position of a seam contour relative to structures of a sewing material, reference positions of the sewing material structures are initially recorded on the basis of a reference sewing material having such structures. Reference structure data sets are generated on the basis of the recorded reference positions using the recorded structure reference positions. After the reference structure data sets have been generated, a working sewing material is sewn with a sewing program, wherein a sewing program can be read in or selected prior to the sewing of the working sewing material and wherein the following steps for preparing the sewing program are carried out prior to the sewing of the working sewing material:

Recording of working positions of sewing material structures of the working sewing material, which correspond to the sewing material structures of the reference sewing material, generating working structure data sets on the basis of the recorded structure working positions, comparing the working positions with the reference positions by comparing the reference structure data sets with the working structure data sets, adapting parameter data of the sewing program on the basis of the deviations between the reference structure data sets and the working structure data sets recorded upon the comparison.

Subsequently, the working sewing material is sewn with the adapted sewing program.

The reference sewing material is not the same as the working sewing material. Thus, the reference sewing material, on the one hand, and the respective working sewing material, on the other hand, are different pieces of sewing material.

Examples of the structures of the sewing material are perforations in the sewing material or patterns or colored patterns, in particular an irregular pattern, in the sewing material. Advantageously, the positions of several consecutive perforations and/or the length or direction of a sequence of perforations or an angle between two sections of a sequence of perforations can be recorded and processed. A course of a pattern or a colored pattern in the sewing material can be recorded and the seam contour can be adapted to it.

It has been recognized that a control method, with which initially generated reference structure data sets are compared with working structure data sets of the sewing material to be sewn, which are generated on the basis of recorded structure working positions, keeps the data processing effort of a corresponding position control method manageable even with the high accuracy and speed requirements necessary for series production. The working structure data sets can be generated in a manner adapted to the structures present in the sewing material. In doing so, characteristics of the structure, for example the arrangement of existing sewing material perforations or pattern specifics, can be taken into account.

The adaptation of the sewing program can be further improved, if at least one deviation between the reference structure data sets and the working structure data sets is taken into account. The control of the position of the seam contour is further improved. The seam pattern is optimized. Exactly one deviation of the deviation categories of "displacement along first sewing coordinate", "displacement along second sewing coordinate," "size difference of structure data sets," "angular deviation" or "size difference of structure data set extension" can be used. Alternatively, it is possible to use more than one of these deviation categories, for example, a combination of two of these deviation categories, three of these deviation categories, four of these deviation categories, or all of these deviation categories.

The listed structure data set deviations have proven to be successful in practice for structures typically present on sewing material. A consideration of displacement deviations along at least one sewing coordinate ensures that there is no undesired offset of the seam contour when comparing the reference sewing material and the current working sewing material. The consideration of a difference in size can, for example, ensure that different reproduction scales do not play an undesirable role in position control when recording the reference sewing material, on the one hand, and the working sewing material, on the other hand. The same applies when an angular deviation or a difference in size between the start and end point of a data set is taken into account.

The insertion of the sewing material into a sewing material frame ensures a reproducible positioning of the sewing material.

A further object of the present disclosure is to provide a sewing device for carrying out the method.

The object is solved with a sewing device which includes a sewing machine, a sewing material frame, a camera system, and a programmable control unit which is in signal communication with the sewing machine and the camera system.

The camera system ensures that a position-critical sewing material with a structure is recorded in the correct position, in such a manner a seam can be sewn along a predetermined path relative to a structure of a sewing material. The camera system can be a stereo camera system. The camera system can be designed in such a manner that the deviation categories can be checked in real time during the sewing process.

BRIEF DESCRIPTION OF THE DRAWINGS

An exemplary embodiment will be explained in more detail by reference to the figures.

DETAILED DESCRIPTION

Figure 1:
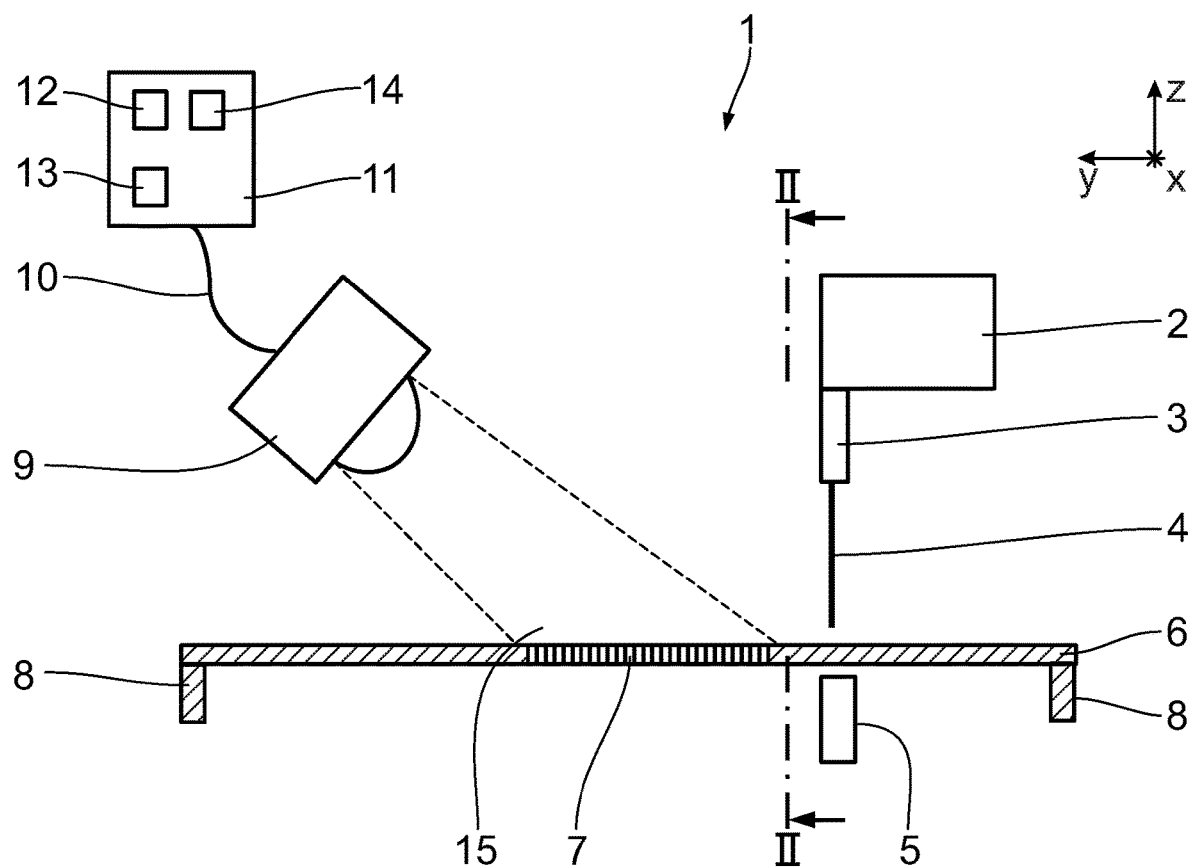
FIG. 1 shows schematically a sewing device.
Figure 2:
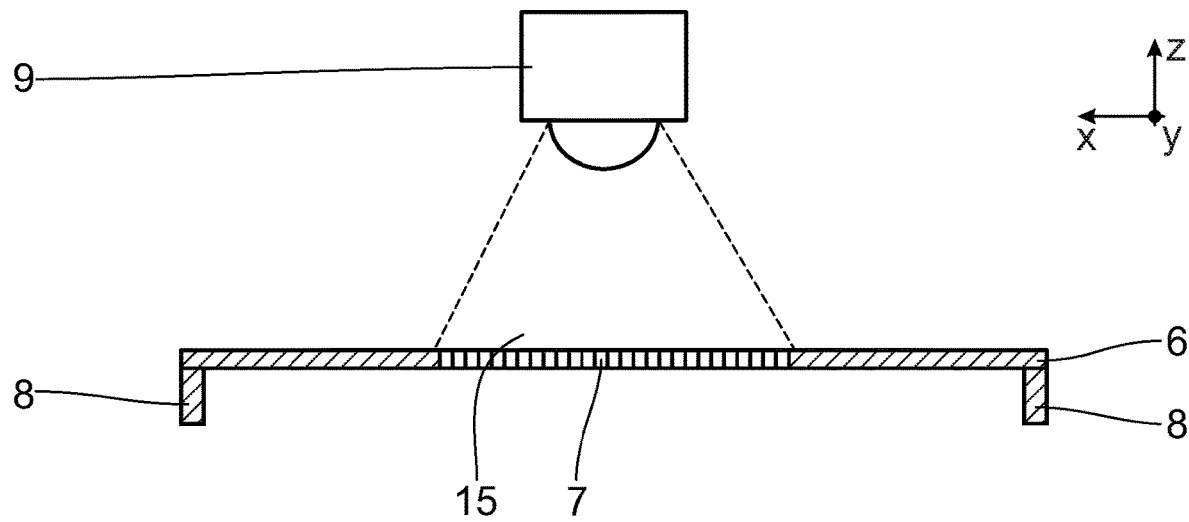
FIG. 2 is an illustration of the sewing device as shown in FIG. 1, cut along lines II-II.

FIGS. 1 and 2 schematically show a sewing device 1. Such a sewing device 1 can, for example, be a CNC sewing device, in particular a CNC sewing device KL 110 of the applicant.

Figure 3:
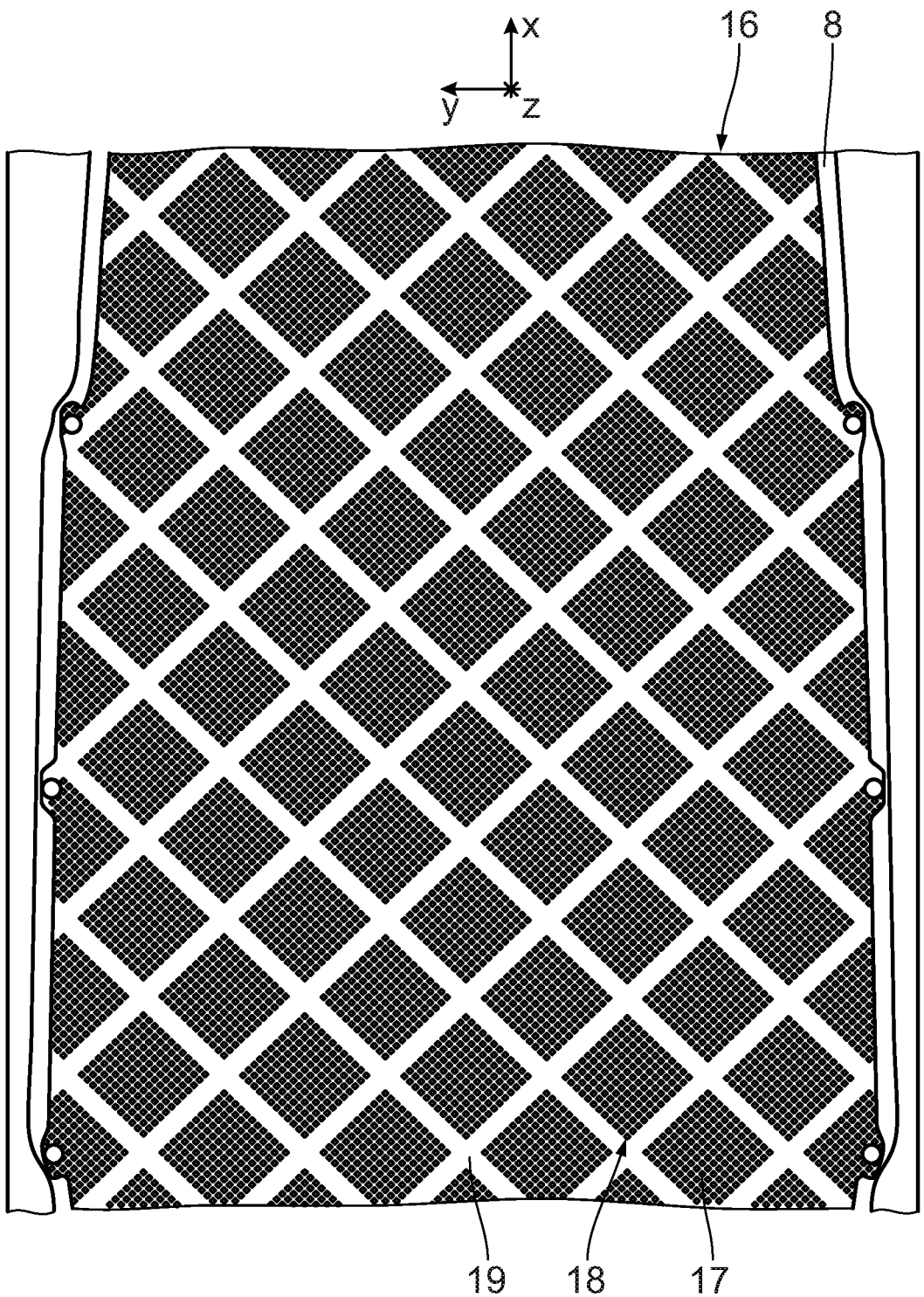
FIG. 3 is a partial view of a working sewing material with a working structure.

To facilitate positional relationships, a Cartesian xyz coordinate system is indicated in FIGS. 1 to 3. The x-axis is perpendicular to the drawing plane of FIG. 1 and runs into it. The y-direction runs to the left in FIG. 1 and the z-direction runs upwards in FIG. 1.

As shown in FIG. 1, the sewing device 1 has a sewing head 2 of a sewing machine. The sewing head 2 includes, among other things, a needle bar 3 with a sewing needle 4, wherein the sewing head 2 is mounted so that it can rotate around the z-axis. A schematically indicated gripper 5 is arranged coaxially and against the z-axis.

There is a sewing material 6 with a structure 7 between the sewing needle 4 and the gripper 5. The sewing material 6 is clamped on a sewing material frame 8. The sewing material frame 8 can perform a movement in the x-y plane relative to the sewing head 2. Due to the rotatability of the sewing head 2 and the movability of the sewing material frame 8 in the x-y plane, three degrees of freedom arise, such that a seam contour in all sewing directions can be realized on the x-y plane.

The sewing material 6 can be a reference material or a working sewing material. A reference sewing material is a sewing material with a structure, wherein the structure is applied to a closely tolerated, optimized material. A sewing program is created on the basis of the reference sewing material. This will be explained in detail in FIG. 4 below. A working sewing material is the sewing material to be sewn with a structure that corresponds to the structure of the reference material, wherein possible irregularities may be present. Such irregularities are usually caused by the application of a structure such as a perforation, since the material warps during the application of the structure, for example by stretching and/or compressing. This results in positional changes of the structure of the working sewing material compared to the structure of the reference material. The unevenness can also be the result of a changed position of the working sewing material in the sewing material frame compared to the reference material in the sewing material frame. As a result of the unevenness, it is necessary to adapt the sewing program. This is also explained in detail below on the basis of FIG. 4.

Starting from the sewing needle 4, shifted along the y-axis, a camera system 9 is provided. The camera system 9 is in signal connection 10 with a control unit 12 of the sewing device 1, in particular a CNC control unit, which is present in a computer unit 11. In particular, the camera system 9 can have two cameras, which are not shown in detail. The camera system 9 can be designed as a stereo camera system or as a smart camera.

A memory element 13, in particular a RAM memory, in which at least one sewing program is stored, is provided in the computer unit 11. In addition, there is evaluation software 14 on the computer unit 11 or in the camera system 9 itself for evaluating images, in particular generated reference images and working images, and for determining reference structure data sets and working structure data sets. The evaluation software 14 exchanges parameters and data with the sewing program, which is processed when a seam is sewn with sewing device 1. Communication between the camera system 9 and the control unit 12 can take place, for example, via a USB (Universal Serial Bus) standard by reading and writing files on a data carrier or via a TCP (Transmission Control Protocol) connection.

The control unit 12 informs the evaluation software 14 which sewing program is to be adapted. The camera system 9 is able to inform control unit 12 of operational readiness, errors, success and the like. On this basis, the control unit 12 can start the evaluation of the camera system 9. After a successful evaluation, the camera system 9 transmits adaptation parameters for the selected sewing program to the control unit 12 by manipulating parameter values, for example to compensate for the displacement of individual points due to the stretching, expansion and/or compression of the sewing material 6. This procedure provides an automatic adaptation of the parameter values for adapting the sewing program. An adaptation is made for each sewing process on the basis of the evaluation of the camera system 9. Prior to each sewing process, the camera system 9 records an image area 15 of the unsewn material 6, from which an image to be evaluated is generated. Depending on the desired seam contour relative to structure 7, the image area 15 can cover the complete sewing material 6 or at least parts of the sewing material 6. Accordingly, an image of the entire sewing material 6 or an image of a partial area of the sewing material 6 can then be generated.

FIG. 3 shows a partial view of an unsewn working sewing material 16, stretched on the sewing material frame 8, with perforation holes 17 in the form of spaced squares 18 standing on their tips. Between the squares 18 standing on their tips, there are intermediate spaces 19, in which a seam contour is to be placed, wherein the seam contour is to be as central as possible between the squares 18 standing on their tips. FIG. 3 shows that the squares 18 along the y-axis, which are standing on their tips, are displaced along the x-axis. At the same time, the squares 18 along the x-axis, which are standing on their tips, are also displaced along the y-axis.

Prior to sewing, the camera system 9 creates an image of the working sewing material 16. This image becomes a working image. From this, working structure data sets are generated, which are compared with reference structure data sets generated from an already created reference image that is not shown. In the present case, the entire sewing material, that is, both the entire reference sewing material and the entire working sewing material, is recorded in order to generate the reference image and also the working image accordingly.

Figure 4:
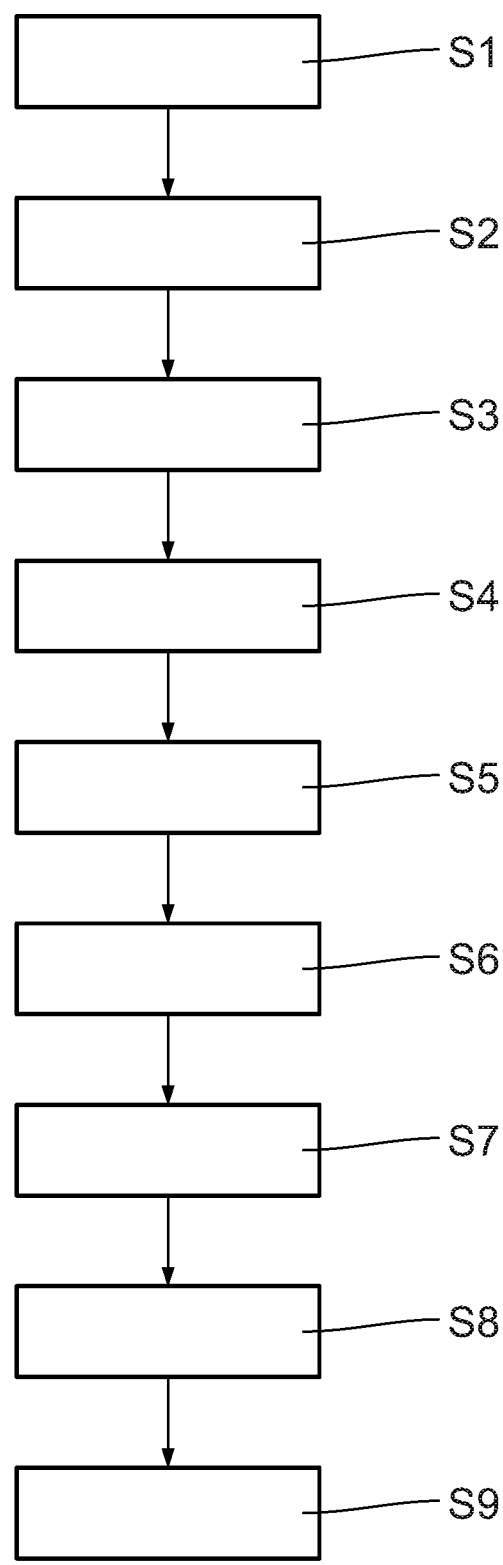
FIG. 4 is a flow chart of a method for controlling the position of a seam contour.

In the following, a method for controlling the position of a seam contour relative to structures 7 of a sewing material 6 is described on the basis of FIG. 4.

Initially, in a step $S_1$, reference positions of the sewing material structures are recorded on the basis of a reference sewing material having such structures. For this purpose, the camera system 9 first generates a reference image of the reference sewing material. In such a case, the entire reference sewing material is recorded. The reference image is then loaded into the camera system 9 and the recognition of the sewing material structures 17, such as perforations, is started.

To record the structure reference positions, measuring lines are created in the camera system 9. The measuring lines are created in the reference image by marking individual perforation holes. By means of the measuring lines, the structures can be recorded. This takes place in particular by recording the start and end point in the x-direction, the start and end point in the y-direction and/or an angle of a measuring line. As a whole, a total of 99 measuring lines (for example) can be generated, wherein each measuring line can be specified with different individual measurement values (that is, parameters).

Reference structure data sets are then generated in step $S_2$ on the basis of the structure reference positions recorded.

For this purpose, the individual measuring lines are stored in the form of pixel or scaled coordinate lists and with reference to a sewing program. This makes it possible to find a measuring line in the image to be evaluated and to evaluate the change in position of the individual perforation holes against the reference. For each parameter of each measuring line, an identifier is defined, which is used for communication with the control unit 12.

Thereafter, steps for preparing the sewing program are initiated in step $S_3$.

In step $S_4$, the control unit 12 informs the camera system 9 which sewing program is to be corrected. The camera system 9 reports the following states to the control unit 12, specifically readiness for operation, evaluation, success and error. The control unit 12 in turn reports the following state to the camera system 9, specifically starting camera evaluation.

In the following step $S_5$, the working positions of material structures 18 of the working sewing material 16, which correspond to the sewing material structures of the reference material, are recorded. For this purpose, the camera system 9 generates an image of the unsewn working sewing material 16. This image becomes the working image.

To record the working positions, measuring lines are generated in the camera system 9. For this purpose, the working image is first loaded into the camera system 9 and the recognition of the perforation holes 17 in the working sewing material 16 is started. Subsequently, measuring lines can be automatically created in the working image by marking individual perforation holes 17. In doing so, the measuring line data of the reference image recording can be used. The creation of the measuring lines can be done in a manner analogous to step $S_1$.

Subsequently, in step $S_6$, working structure data sets are generated on the basis of the structure working positions recorded. This takes place in a manner analogous to step $S_2$ and on the basis of the reference structure data sets stored for the corresponding sewing program.

Subsequently, in step $S_7$, the working positions are compared with the reference positions by means of a comparison between the reference structure data sets with the working structure data sets. The comparison results in corresponding deviation parameters, on the basis of which the sewing program can be adapted.

The adaptation of parameter data of the sewing program on the basis of the deviations between the reference structure data sets and the working structure data sets recorded during the comparison is carried out in step $S_8$.

A deviation between the reference structure data sets and the working structure data sets is taken into account from at least one deviation category in the following group:

- Displacement of the working sewing material relative to the reference material along a sewing coordinate,
- Displacement of the working sewing material relative to the reference sewing material along a second sewing coordinate, which is perpendicular to the first sewing coordinate,
- Size difference of a working structure data set relative to the reference structure data set along at least one of the sewing coordinates,
- Angular deviation of an extension of the working structure data sets relative to the reference structure data sets along a sewing coordinate, along a line connection of a start point and an end point of the respective data set, and
- Size difference of an extension of the working structure data sets relative to the reference structure data sets along a sewing coordinate along a line connection of a start point and an end point of the respective data set.

The adaptation of the sewing program takes place via the camera system 9. In doing so, the camera system 9 changes the selected sewing program by manipulating the parameter values in the sewing program. This takes place on the basis of at least one of the above deviation categories or a combination of at least two of the above deviation categories. For example, the sewing program is stored on the computer unit 11 that is jointly used by the camera system 9 and the control unit 12. Alternatively, the camera system 9 can also transmit the parameter values directly to the control unit 12, which then influences the currently selected sewing program. This procedure enables a correction for each sewing process on the basis of the camera evaluation.

For this purpose, the parameters to be used must be entered in the sewing program with an allocation. Depending on the evaluation of the first measurement results with differently tolerated material samples, the defined parameters can then be calculated in the sewing program. Standard commands made available by control unit 12 are used for this purpose. The commands can cause the entire sewing program and/or individual seam contours and/or individual start and end points of seams to be displaced. In addition, the commands can cause the sewing material to stretch or compress. In addition, the commands can be used to compensate for angular errors. The corresponding correction commands are entered in the sewing program, in such a manner that a change is made to the reference sewing program.

Subsequently, in step $S_9$, the working sewing material 16 is sewn with the adapted sewing program. Sewing then takes place along a precisely predetermined path relative to the structure 18 of the working sewing material 16.

The invention claimed is:

1. A method, comprising:
   recording reference positions of sewing material structures by a reference sewing material having such structures;
   generating reference structure data sets based on the recorded reference positions;
   recording of working positions of sewing material structures of a working sewing material, which correspond to the sewing material structures of the reference sewing material,
   generating working structure data sets based on the recorded working positions,
   comparing the working positions with the reference positions by comparing the reference structure data sets with the working structure data sets,
   creating an adapted sewing program by adapting parameter data of the sewing program based on deviations between the reference structure data sets and the working structure data sets detected during the comparing step; and
   sewing the working sewing material with the adapted sewing program.

2. The method according to claim 1, wherein at least one deviation between the reference structure data sets and the working structure data sets from the following group is taken into account:
   a displacement of the working sewing material relative to the reference sewing material along a first sewing coordinate,
   a displacement of the working sewing material relative to the reference sewing material along a second sewing coordinate, which is perpendicular to the first sewing coordinate,
   a size difference of the working structure data sets relative to the reference structure data sets along at least one of the sewing coordinates,
   an angular deviation of an extension of the working structure data sets relative to the reference structure data sets along a coordinate along a line connection of a start point and an end point of the respective data set; and
   a size difference of an extension of working structure data sets relative to reference structure data sets along a coordinate along a line connection of a start point and an end point of the respective record.

3. The method according to claim 1,
   wherein the sewing material is inserted into a sewing material frame, and
   wherein the reference positions and the working positions are recorded with the inserted sewing material.

4. A sewing device (1), comprising:
   a sewing machine controlled by a sewing program,
   a sewing material frame (8),
   a camera system (9), and
   a programmable control unit (12), which is in signal communication with the sewing machine and the camera system,
   wherein the sewing device (1) is configured to perform the following steps:
      recording, with the camera system, reference positions of sewing material structures in a reference sewing material having such structures while the reference sewing material is held in the sewing material frame (8);
      generating, with the programmable control unit (12), reference structure data sets based on the recorded reference positions;
      recording, with the camera system, working positions of sewing material structures of a working sewing material, which correspond to the sewing material structures of the reference sewing material while the working sewing material is held in the sewing material frame (8);
      generating, with the programmable control unit (12), working structure data sets based on the recorded working positions;
      comparing the working positions with the reference positions by comparing the reference structure data sets with the working structure data sets;
      creating an adapted sewing program by adapting parameter data of the sewing program based on deviations between the reference structure data sets and the working structure data sets detected during the comparing step; and
      sewing the working sewing material by the sewing machine with the adapted sewing program.

* * * * *